(12) United States Patent
Thompson

(10) Patent No.: US 11,272,320 B1
(45) Date of Patent: *Mar. 8, 2022

(54) MOBILE ELECTRONIC DEVICE FOR IDENTIFYING AND RECORDING AN ANIMAL HARVEST

(71) Applicant: Iiley Thompson, Sherwood, OR (US)

(72) Inventor: Iiley Thompson, Sherwood, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,455

(22) Filed: Mar. 4, 2019

Related U.S. Application Data

(63) Continuation of application No. 14/939,038, filed on Nov. 12, 2015, now Pat. No. 10,257,651.

(60) Provisional application No. 62/108,205, filed on Jan. 27, 2015.

(51) Int. Cl.
*H04W 4/02* (2018.01)
*G06F 16/22* (2019.01)
*G06F 16/29* (2019.01)

(52) U.S. Cl.
CPC ........ *H04W 4/025* (2013.01); *G06F 16/2282* (2019.01); *G06F 16/29* (2019.01)

(58) Field of Classification Search
CPC ...... G06Q 30/018; G06Q 10/10; G07D 11/10; G07D 11/26; G07D 11/40; G07F 19/205; H04W 4/029; H04W 4/02; H04W 4/50; H04L 29/06034; H04L 29/08657; H04L 67/18; H04L 67/38
See application file for complete search history.

(56) References Cited

U.S. PATENT DOCUMENTS

| | | | |
|---|---|---|---|
| 6,317,030 B1 | 11/2001 | Magee | |
| 6,459,372 B1 | 10/2002 | Branham | |
| 8,428,614 B2 | 4/2013 | Wolfe | |
| 8,483,446 B2 | 7/2013 | Demarais et al. | |
| 9,619,684 B2 * | 4/2017 | Auer | A61D 7/00 |
| 2001/0054961 A1 * | 12/2001 | Twining | A01K 97/00 |
| | | | 340/573.1 |
| 2005/0145187 A1 * | 7/2005 | Gray | A01K 29/00 |
| | | | 119/174 |
| 2008/0228515 A1 * | 9/2008 | Tachikawa | G06Q 10/08 |
| | | | 705/1.1 |
| 2009/0231190 A1 | 9/2009 | Grumbles | |
| 2010/0322483 A1 * | 12/2010 | Margolis | G06K 9/00979 |
| | | | 382/110 |
| 2012/0011076 A1 | 1/2012 | Crissy | |
| 2013/0012234 A1 | 1/2013 | Tuffy et al. | |

(Continued)

OTHER PUBLICATIONS http://buckscore.com, 1 page.

(Continued)

*Primary Examiner* — Timothy X Pham
(74) *Attorney, Agent, or Firm* — Edell, Shapiro & Finnan LLC

(57) ABSTRACT

Systems, methods and one or more computer readable storage media are configured to facilitate entry by a user into a first electronic device of information associated with an animal harvest, where the information includes at least one of an animal species, a geographic location indicating where the animal harvest occurred, and a date of the animal harvest. Harvest data is uploaded from the first electronic device to a second electronic device, where the harvest data includes the information entered by the user.

17 Claims, 18 Drawing Sheets

(56) References Cited

U.S. PATENT DOCUMENTS

| | | | |
|---|---|---|---|
| 2014/0012861 A1 | 1/2014 | Bradsher | |
| 2014/0122352 A1* | 5/2014 | Gleim | G06Q 30/018 |
| | | | 705/317 |
| 2014/0200961 A1* | 7/2014 | Folks | G06Q 50/26 |
| | | | 705/7.34 |
| 2014/0307086 A1* | 10/2014 | Ota | G01B 11/02 |
| | | | 348/137 |
| 2015/0055827 A1* | 2/2015 | Bailey | A61B 5/1118 |
| | | | 382/103 |
| 2015/0069118 A1* | 3/2015 | Roys | G09F 3/0297 |
| | | | 235/380 |
| 2015/0294641 A1 | 10/2015 | Jones | |
| 2015/0339501 A1* | 11/2015 | Auer | A61D 1/025 |
| | | | 235/375 |
| 2016/0316723 A1 | 11/2016 | Wall et al. | |

OTHER PUBLICATIONS http://download.cnet.com/Buckulator-how-to-score-track-and-hunt-whitetail-deer/3000-18495_4-75570510.html, 4 pages.
http://www.amazon.com/Hunt-Map-1-0-Full-Verison/dp/B000W2BY3S, 3 pages.
http://www.scoutlookweather.com/mobileApps.php2deerlog, 1 page.

* cited by examiner

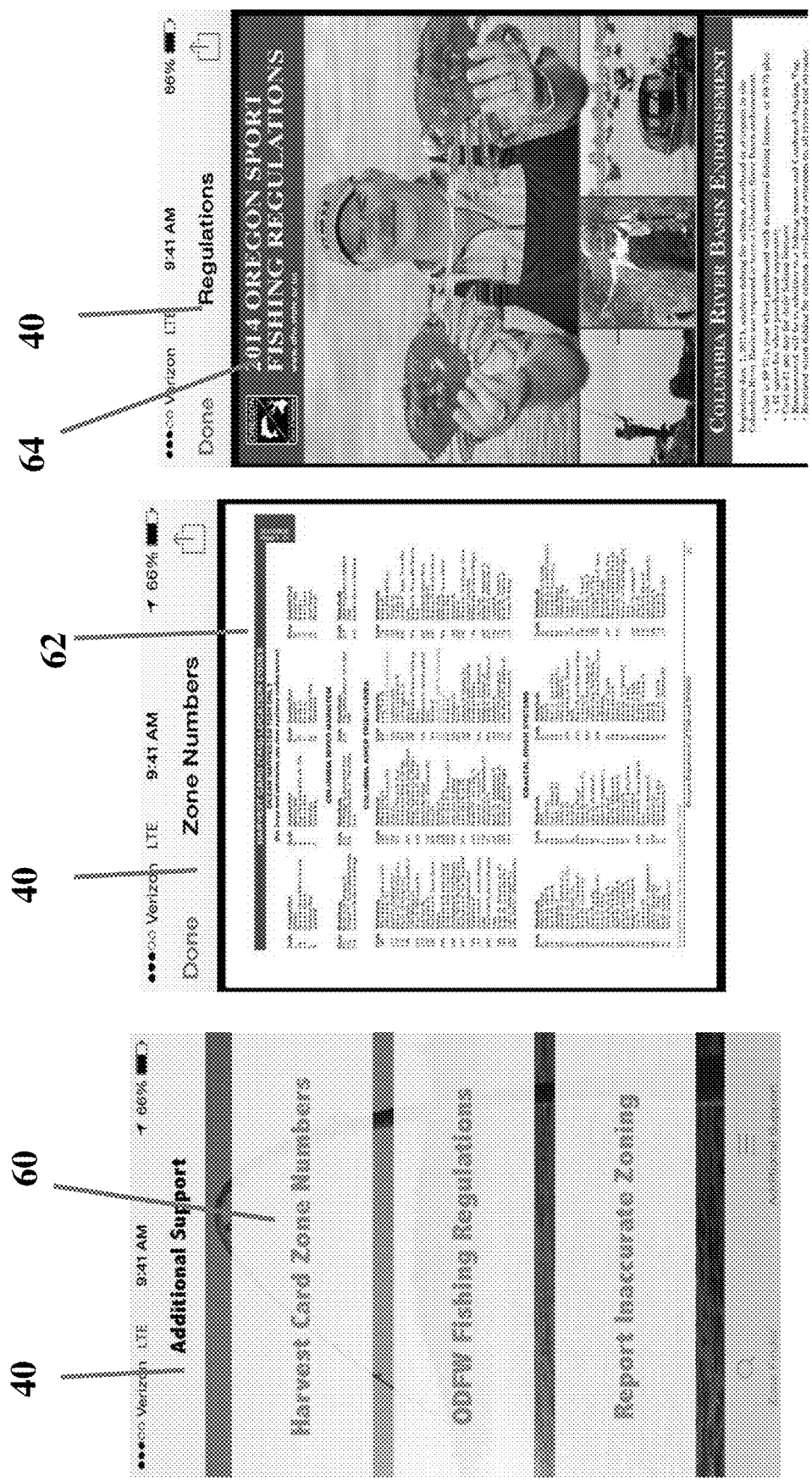

MOBILE ELECTRONIC DEVICE FOR IDENTIFYING AND RECORDING AN ANIMAL HARVEST

CROSS REFERENCE TO RELATED APPLICATIONS

This is a Continuation of U.S. patent application Ser. No. 14/939,038 filed Nov. 12, 2015, which claims priority to U.S. Provisional Application Ser. No. 62/108,205 filed Jan. 27, 2015, and the disclosures of these applications are incorporated herein by reference in their entireties.

FIELD

The present invention relates to a mobile electronic device that assists a user in the identification and recording of a harvest of fish or other game in fishing and hunting activities.

BACKGROUND

Hunting and fishing activities of wildlife game are popular for the outdoor sports enthusiast. To ensure that such activities can be sustainable and also are beneficial to the ecology of a particular wildlife environment, federal and/or local government laws and/or regulations are typically implemented to control how and when harvesting of wildlife animals can occur. Such laws and/or regulations include the requirement for one to obtain a hunting or fishing license for a particular harvest season, as well as rules for controlling the number and/or types of animals that can be harvested during this season. For example, local gaming authorities may obtain information on animals harvested by requesting or requiring that information is reported regarding wildlife animals being harvested (including information relating to the species of the animal, size of the animal, sex of the animal, etc.). This allows local gaming authorities to ascertain a particular animal population at any given time and accordingly establish harvesting rules as needed to ensure such animal population can be sustained. Currently, reporting of harvesting by people engaged in wildlife gaming activities is performed by manually reporting to local authorities (e.g., at reporting stations).

Accordingly, it would be desirable to provide a mechanism allowing a wildlife sports person to record and/or report information relating to a harvest in a an easy and reliable manner.

SUMMARY

In accordance with example embodiments of the invention, one or more computer readable storage media are encoded with software comprising computer executable instructions that, when the software is executed, are operable to facilitate entry by a user into a first electronic device of information associated with an animal harvest, where the information comprises at least one of an animal species, a geographic location indicating where the animal harvest occurred, and a date of the animal harvest. The instructions are further configured to upload harvest data from the first electronic device to a second electronic device, where the harvest data includes the information entered by the user.

Systems and methods are also described herein that are configured to perform the same or similar operations as the one or more computer readable storage media.

BRIEF DESCRIPTION OF THE DRAWINGS

FIGS. 5A-5C depict example embodiments of a graphical user interface for the electronic device of FIG. 1 that implement certain features in accordance with the present invention.

Like reference numerals have been used to identify like elements throughout this disclosure.

DETAILED DESCRIPTION

As described herein, an electronic device is configured to facilitate identification and recording of animal harvests, such as identifying and recording the harvesting of fish or hunting of deer, fowl or other game. In example embodiments described herein, an electronic device comprises a mobile device configured with one or more software applications, also referred to herein as mobile applications or mobile apps, that provide a suitable user interface for user interaction with the mobile device to facilitate entry of information by the user to identify a species of a harvested animal and record a location, time and specific features of the harvested animal for entry at a database that is accessible by other users. As used herein, the term "harvest" refers to capture and/or killing of an animal for human use (e.g., capture and release of an animal, or capture and kill of an animal for human use and/or consumption). The example embodiments described herein are in relation to harvesting of fish. However, the invention is also applicable to harvesting of a variety of different animal species including, without limitation, fish, deer, bear, turkeys or other fowl and/or any other types of wildlife game sanctioned for harvest.

Figure 1:
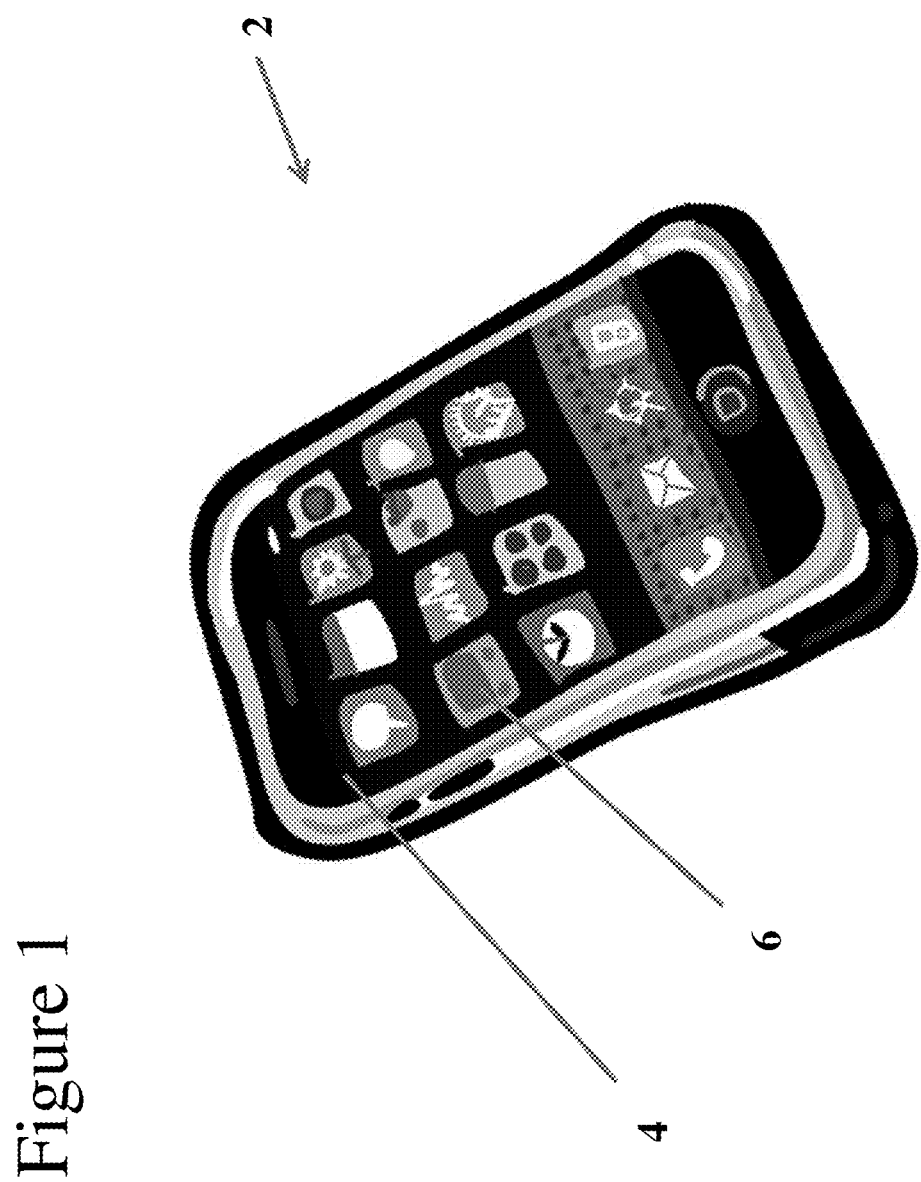
FIG. 1 depicts an example embodiment of an electronic device configured for implementing features in accordance with the present invention.

An example embodiment of a mobile device 2 implemented for operation in accordance with the present invention is depicted in FIG. 1 and comprises a mobile phone or smart phone. The mobile device 2 includes a display 4 and a series of icons or tiles 6 displayed that represent software applications or mobile apps for the phone 2.

Figure 2:
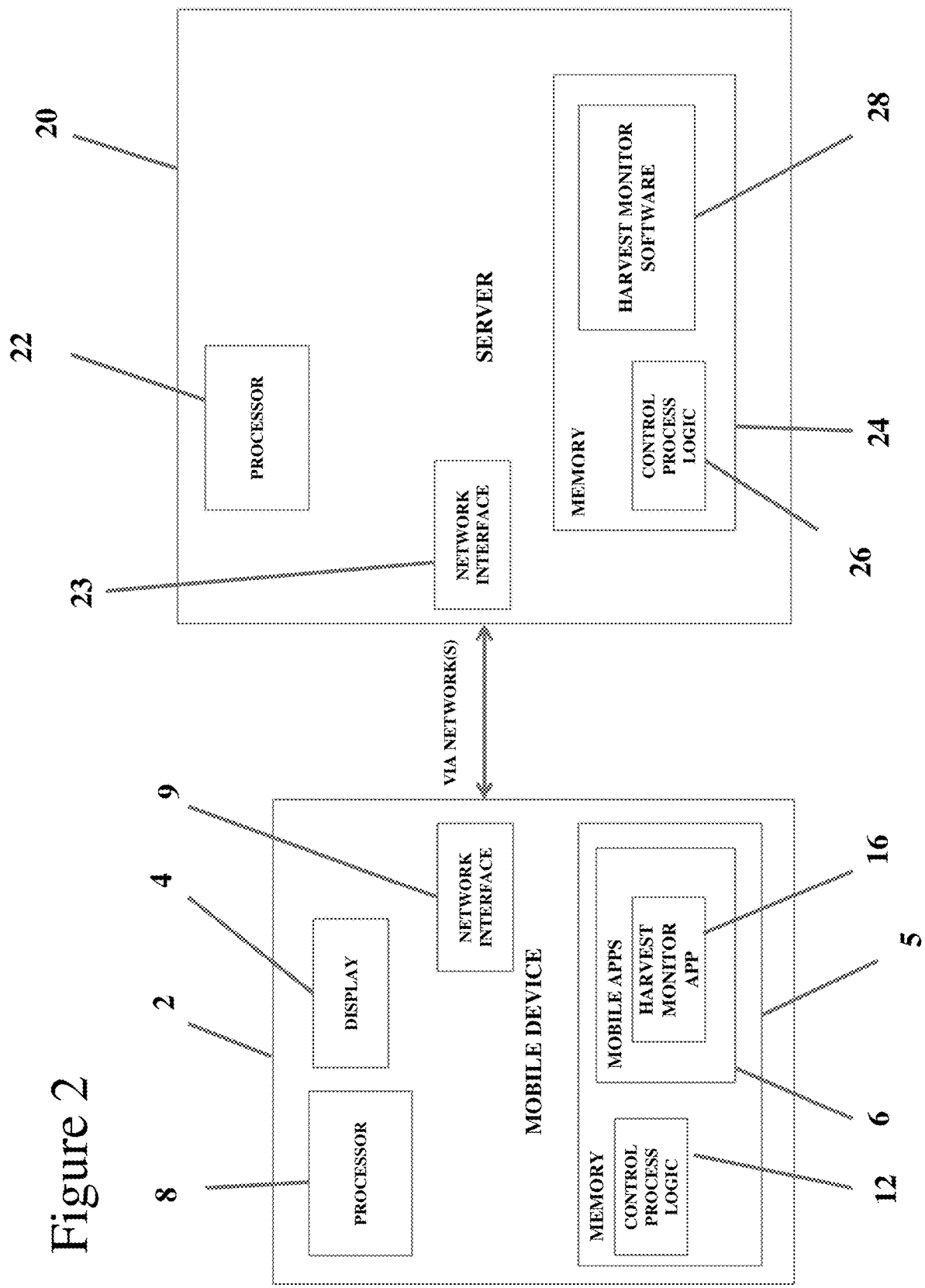
FIG. 2 depicts a schematic box diagram of a system configured to implement features in accordance with the present invention.

A schematic block diagram is depicted in FIG. 2 of an environment or a system in which the mobile device 2 communicates with other electronic devices, such as a server 20 that receives and stores harvesting information provided by users via mobile devices 2 and/or other types of electronic devices as described herein. In particular, communications and exchange of information between electronic devices is facilitated via any suitable one or more networks (represented by the double arrow linking mobile device 2 with server 20). Examples of types of networks that can be utilized to facilitate communications and exchange of information between two or more electronic devices include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. It is to be understood and appreciated that, while FIG. 2 only shows mobile device 2 in communication with server 20, the network(s) facilitate communications with any selected number of electronic devices (e.g., hundreds, thousands or more computing devices).

In addition to the display 4, the mobile device 2 includes a processor 8, a network interface 9, and memory 5. Similarly, the server 20 includes a processor 22, a network interface 23, and memory 24. Each of the mobile device 2 and server 20 can further be integrated with other devices and/or include any suitable types of peripheral devices that can be connected to the devices to facilitate input of audio, video or other information by a user to the computing device (e.g., keyboards, mouse devices, cameras, microphones, etc.) as well as presentation (output or display) of audio, video and/or other types of information to the user by the devices.

The network interfaces 9 and 23 can be, for example, one or more of an Ethernet interface card or switch, a modem, a router or any other suitable hardware device that facilitates a wireless and/or hardwire connection over the network(s), where the network interface unit can be integrated within the device (e.g., for the mobile device 2) or a peripheral that connects with the device (e.g., for the server or any other electronic device in communication with other electronic devices via the network(s)).

Each of the processors 8, 22 can comprise a microprocessor that executes control process logic instructions 12, 26 stored within memory 5, 24, including operational instructions and software applications stored within such memory, such as the mobile apps 6 stored within the memory 5 of the mobile device 2 or that software application(s) 28 stored within memory 24 of the server 20. The processors 8 and 22 perform operations in accordance with the steps set forth in the flow chart of FIG. 3 and utilizing the harvest monitor app 16 and harvest monitor software 28 of memories 5 and 24.

The memories 5 and 24 of the mobile device 2 and server 20, respectively, comprise one or more computer readable storage media that may further comprise read only memory (ROM), random access memory (RAM), magnetic disk storage media devices, optical storage media devices, flash memory devices, electrical, optical and/or other physical/tangible (e.g., non-transitory) memory storage devices, and any combinations thereof. In other words, the one or more computer readable storage media are one or more physical, tangible hardware devices that that can retain and store instructions for use by an electronic device (e.g., a mobile phone or other computer device that incorporates some or all of the one or more computer readable storage media), for example including software comprising computer executable instructions operable to perform certain operations when the software is executed. A computer readable storage medium (or one or more computer readable storage media), as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The display 4 of the mobile device 2 can be an LCD or any other suitable type of display, including a touch pad display for display of textual and/or graphical content by the processor, including audio, video, textual, interactive and/or any other forms of content which may be operated and controlled by a user utilizing a mobile app 6 such as the harvest monitor app 16.

The mobile device 2 and/or other electronic devices, including server 20, can utilize any suitable operating system (OS) to enable operations of the devices including, without limitation OS platforms commercially available under the trademarks or tradenames Microsoft Windows (Microsoft Corporation), OS X (Apple), iOS (Apple Inc.), Linux, Android (Google Inc.), etc. Example embodiments of a mobile device 2 that can be implemented to utilize the harvest monitor app 16 within memory 5 to perform operations in accordance with the present invention include, without limitation, smart phones commercially available under the trademarks or tradenames Apple iPhones (Apple, Inc.), Samsung Galaxy (Samsung Corporation), Xperia (Sony Corporation) and LG (LG Corporation). However, as previously noted, harvest monitor applications of the present invention can also be implemented with any other suitable electronic/computing device including, without limitation, personal computers such as desktop computers, laptops, tablets and/or any other types of computing devices implementing any of the previously noted OS platforms to facilitate performing operations in accordance with the present invention. Further, it is noted that the server 20 depicted in FIG. 2 can be implemented as a single server or any number of server devices.

The harvest monitor app 16, harvest monitor software 28, and/or any other types or forms of suitable software utilized to perform harvest recording operations in accordance with the present invention can be obtained in any suitable manner. For example, the harvest monitor app 16 can be downloaded from the server 20 and/or any other suitable computing device for storage and use by the mobile device 2 as well as other electronic devices.

Figure 3:
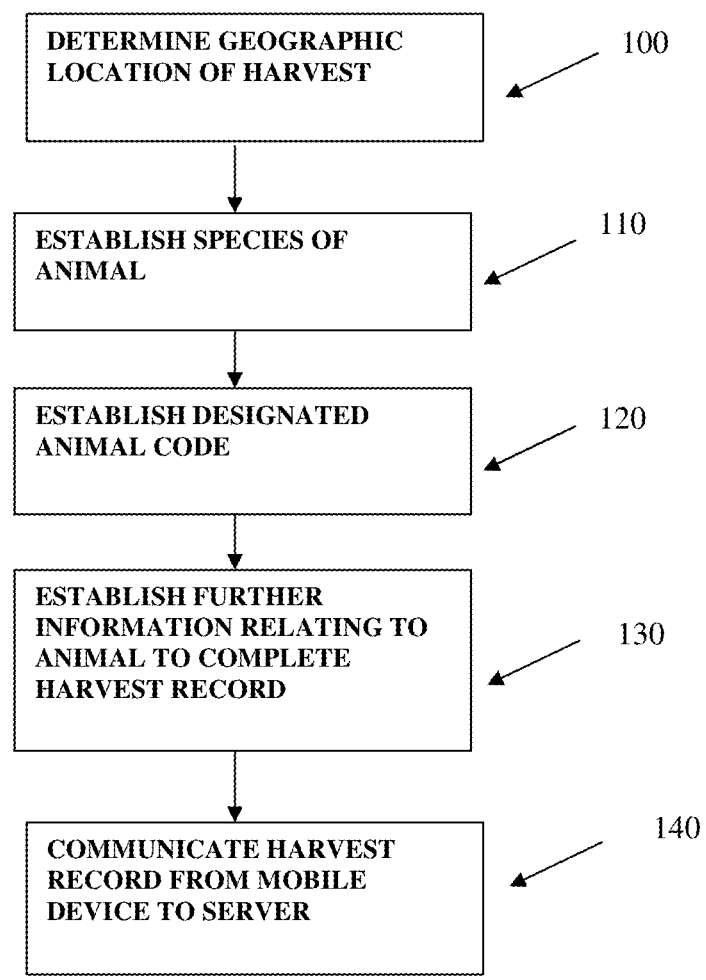
FIG. 3 depicts a flow chart of operational features for an example embodiment in accordance with the present invention.

Operation of the mobile device 2 within the system for identifying and recording an animal harvest is described with reference to the flowchart of FIG. 3. A user, such as a fisherman, implements the operations of the present invention by initially opening or enabling the harvest monitor app 16 on the mobile device 2 (e.g., by clicking on an icon on the display 4 representing the app 16). When implemented, the harvest monitor app 16 provides a user interface (e.g., refer to FIGS. 4-6) that allows the user to enter information about the harvest as well as obtain information regarding the harvest via the app 16.

When a fish is caught by the user and the user desires (or is required) to record the harvest (e.g., catch and release, or catch and keep), a geographic location of the harvest is initially determined at 100. A geographic reference code (GRC) can represent, e.g., a body of water, county, or territory in which the harvest was made. A GRC can be assigned, e.g., by a designated federal, state and/or local governmental body or authority that manages and governs harvest records for regulated fish and/or game animals. Alternatively, the GRC can be assigned by a private entity that hosts a website and/or a software platform that collects harvest data for mobile and/or other electronic devices. In an example embodiment, a GRC can be obtained through publicly available information, such as web based and/or other types of publications provided by the federal/state/local regulatory authority for the geographic region (see, e.g., http://www.dfw.state.or.us/resources/licenses_regs/ docs/fishing_harvest_card_location_codes.pdf, which is a website publication by the state of Oregon relating to harvest location codes for particular areas in which fish or other game is harvest). GRC information can be downloaded by the mobile device 2 for use as needed and/or for storage by the device for use by the app 16.

Figure 4C:
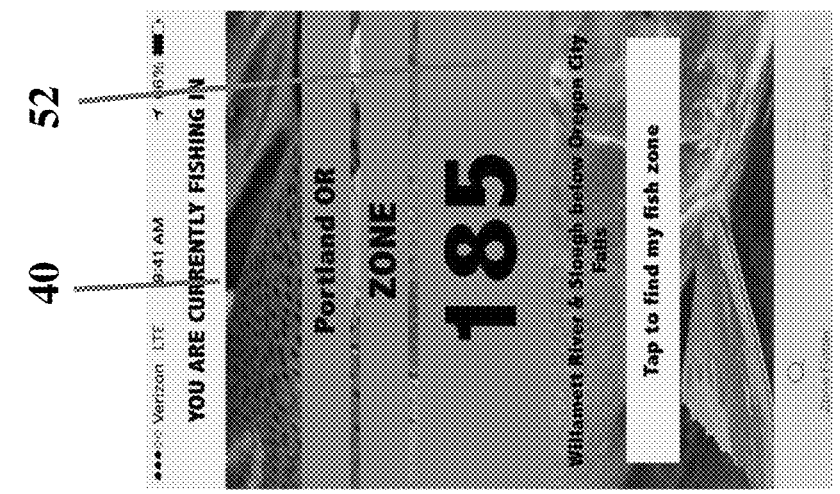
FIGS. 4A-4D depict example embodiments of a graphical user interface for the electronic device of FIG. 1 that implement certain features in accordance with the present invention.

The harvest monitor app 16 can download GRCs for the mobile device 2 (e.g., from the server 20 and/or from other sources available over the Internet or other networks). The app 16 can either obtain a specific geographic location from manual entry by the user (e.g., the user enters a specific area or region and/or the GRC region in which the harvest was made, such as manual entry of the name of a site, park, lake or other area, the particular mile marker on a specific trail, etc.) or automatically using GPS (global positioning system) software. For example, the mobile device 2 can utilize conventional and/or any other types of suitable GPS software to obtain specific GPS coordinates identifying a global position of the mobile device 2, and such information can be utilized by the app 16 (e.g., in combination with GRC information available for use by the app 16) to automatically obtain the GRC. In an example embodiment depicted in FIGS. 4A-4C, a graphical user interface (GUI) 40 for the harvest monitor app 16 displayed by the display 4 of the mobile device 2 provides an option for the user to allow the app 16 to access the user location so as to automatically obtain the GRC. When the user enables the app 16 to perform this operation (by selecting "ALLOW" in the pop-up menu option 50 displayed on GUI 40 in FIG. 4A), the app 16 performs operations (e.g., utilizing GPS location software) to obtain the location of the mobile device 2 and convert such location information to a GRC value. As shown in FIG. 4C, the app 16 automatically obtains the GRC value of 185 (e.g., representing an area of the Willamette River and Slough below Oregon City Falls in Oregon).

In example embodiments, the harvest monitor app 16 can further be configured to automatically obtain additional information (e.g., from the server 20) associated with the GRC that may be of interest to the user of the mobile device 2. For example, a federal, state and/or local governmental body or authority that manages and governs harvest records for regulated fish and/or game animals in a particular GRC region may provide time sensitive alert messages relating to hunting and/or fishing restrictions or allowances in the GRC region, and such messages can be downloaded by the harvest monitor app 16 for display by the mobile device 2. For example, in a scenario in which recorded harvesting of one or more different types of fish in a particular GRC region and over a certain time period is large enough that there is a concern for over-harvesting, an alert message may be provided that establishes a limit or a restriction on harvesting of the type(s) of fish in that GRC region for a select time period.

A specific example scenario of an alert message for a GRC region that may be provided by the harvest monitor app 16 for display by the mobile device 2, when that specific GRC region has been identified as described herein, can be "this zone is closed for fishing from Aug. 1, 2015 through Oct. 1, 2015". In another example embodiment for a specific type of fish, the alert message might be "A non-fin clipped fish cannot be harvested in this zone as of 8/1. Notification of allowance of harvesting of non-fin clipped fish in this zone will be indicated at a future date." A still further example of an alert message is "As of Nov. 1, 2014, a non-fin clipped fish may be harvested in this zone." The alert notice can be provided in any suitable format as a display message and during any time in which the harvest monitor app 16 is enabled and a GRC region of interest has been identified. An example embodiment of an alert message 54 (a fictitious message provided by the state of Washington Department of Fish and Wildlife—WDFW) for an identified GRC region (displayed in the GUI 40 as Forks, Wash.) provided to the display of the mobile device 2 via the harvest monitor app 16 is depicted in FIG. 4D. The harvest monitor app 16, via the GUI 40, can also allow the user to access further information about the alert message 54 (e.g., by providing a link to the site of the governmental body or authority that manages and governs harvest records for regulated fish and/or game animals in the GRC region, or obtaining additional information about the alert from the server 20 for display via the GUI 40).

At 110, an animal type and/or species is established. The animal type or species can also be obtained via public record information, images, drawings and/or historical reference information that is available to the user and/or via the harvest monitor app 16. For example, the user may know the particular species of a fish that is caught. Alternatively, the user may utilize the app 16 and/or other apps of the mobile device 2 to assist in identifying the fish species (e.g., by viewing photographs, drawings and/or other information displayed by the mobile device for making a determination regarding the species of fish caught). Some examples of fish species that may be harvested in a particular GRC region include, without limitation, Chinook Salmon, Coho salmon, Steelhead, Sturgeon, Halibut, clams, crab, etc. Entry of information regarding the animal species (as well as other types of information to be provided by the user) may be enabled, utilizing the GUI 40, via a pull-down menu (where different animals and/or animal species are available in the pull-down menu for selection by the user), via entry of text within user-fillable fields of the GUI 40, etc.

In another example embodiment, the app 16 can facilitate an automatic identification from a photograph of the species of fish caught by the user. For example, the user can capture and save a photographic (digital) image of the fish (or other animal) that has been caught utilizing a built-in camera of the mobile device 2, and this captured image can be utilized by the app 16 to automatically identify or suggest a species of the fish (e.g., based upon image recognition software associated with the app 16 that identifies elements of the fish and compares such identified elements with a catalog or library of images of known fish species in order to provide recommendations to the user identifying the caught fish). Alternatively, the app 16 can provide the photographic (digital) image captured by the mobile device 2 as part of the harvest data to be uploaded to the server 20 and/or saved by the mobile device 2 in relation to the specific harvest record.

Upon establishing the animal species, a designated animal code is established at 120. Animal codes can be assigned, e.g., by the designated federal, state and/or local governmental body or authority that manages and governs harvest records for regulated fish and/or game animals in the GRC region. Alternatively, animal codes can be assigned by a private entity hosting the server 20 that collects harvest data records. Animal codes can be obtained through public information including, without limitation, public website information that may be downloaded as needed and/or stored by the mobile device 2 for use by the app 16. An example embodiment of animal codes for fish species is provided in the following table:

| Codes | Species of Fish |
|---|---|
| 1 | Chinook Fin-Clipped (Hatchery) (king or blackmouth) - has black lower gum line |
| 1W | Chinook Unmarked (Wild) (king or blackmouth) - has black lower gum line |
| 2 | Coho Fin-Clipped (Hatchery) (silver) - has white lower gum line |
| 2W | Coho Unmarked (Wild) (silver) - has white lower gum line |
| 3 | Other Salmon - Pink (humpy); Chum (dog); or Sockeye |

The animal code can be manually entered at the GUI 40 or automatically provided by the harvest monitor app 16 (e.g., based upon an automatic identification of the animal species or in response to the user manually entering the animal species name via the GUI 40). In an example embodiment, the GUI 40 provides a listing, such as a pull-down menu representing information such as that shown in the previous table that allows the user to select an animal species (step 110), and this automatically results in the animal code being established (step 120).

In an embodiment in which the user has not identified the animal species but instead captures an image of the harvested animal, an animal code can be provided for the harvest record later. For example, a harvest record that has not been animal coded can be flagged or marked for later coding (e.g., providing some identified indicating the record is not complete). An administrator of the server 20, utilizing the captured image of the harvested animal and/or other information provided by the user via the app 16, can provide the animal code to complete the harvest record. Alternatively, the user of the mobile device 2 can also provide the animal code at a later date.

In addition to the animal code being provided via the app 16, further information can optionally be provided by the user to the app 16 (via the GUI 40) at 130 in relation to the harvest. For example, a federal, state and/or local regulatory authority or, alternatively, a private entity, hosting the server 20 may require that a harvest record for a particular animal code include information such as time/date of harvest, status of harvest (e.g., catch and release or catch and keep), animal size (e.g., animal length and/or weight), animal sex, specific features and/or markings of animal (e.g., colors, hatchery and/or radio frequency tagmarkings, injury marks and/or other features that may be unique to the animal), etc. In an example embodiment, such additional information for a harvested fish species might be as follows:

| Zone | Fish | Size | Date | Wild/Hatchery |
|---|---|---|---|---|
| 185 | Coho (silver) fin clipped | 32 inches | Nov. 1, 2012 | Hatchery |

In this example, the zone 185 refers to the GRC region, features of the fish are that it is a Coho (silver) and has one or more fins clipped (indicating the fish is from a hatchery), the size is 32 inches, the harvest date is Nov. 1, 2012, and the fish is not wild but came from a hatchery (indicated by the one or more clipped fins). The information can be provided through the GUI 40 in any suitable manner (e.g., via one or more drop-down menus, via user-fillable text fields, etc.).

At 140, the harvest information can be communicated from the mobile device 2 to the server 20. The server 20, utilizing harvest monitor software 28, maintains harvest records for one or more different types of animals and/or animal species. For example, the server 20 can comprise a database hosted by a federal, state and/or local regulatory authority that maintains data records on harvested animals for purposes of monitoring and controlling ecological environments within the GRC region regulated by such authority. Alternatively, the server 20 can comprise a database hosted by a private entity that provides access to harvest information to users (e.g., subscribers to the database). For example, the harvest information may be of interest to users such as hunters and/or fishing enthusiasts desiring information regarding types of animals and/or animal species that are harvested as well as frequency of harvest of such animals/animal species in particular GRC regions.

Other information that can be communicated to the server 20 by the mobile device 2 includes information about the user harvesting the animal, such as user name and other information associated with the user such as user address, user phone number, etc. The user may also be prompted by the app 16 to provide license information (e.g., information relating to a hunting license, a fishing license or a fishing permit) that may be required by the designated federal, state and/or local governmental body or authority that manages and governs harvest records for regulated fish and/or game animals in the GRC region in which the animal is harvested. In an example embodiment, the user may provide his or her hunting and/or fishing license registration and any other information about the user (e.g., user name, address, phone number, etc.) in an initial (e.g., start-up) feature of the app 16 so that the app 16 automatically provides the user's license information as part of the harvest data each time such data is provided to the server 20. Other features of the app 16 can include license registration and/or license renewal of the user via the app 16 with the designated federal, state and/or local governmental body or authority that manages and governs harvest records for regulated fish and/or game animals in a particular GRC region.

The harvest monitor app 16 can further provide a display within the GUI 40 of information entered by the user and/or automatically obtained by the app 16 for review by the user prior to being provided for recordation at the server 20. Any information that may be inaccurate can be corrected by the user prior to recordation. In addition, the app 16 may store the harvest data at the memory 5 of the mobile device 2 in addition to providing such harvest data to the server 20 for recordation. Further, the specific GPS coordinates obtained by the mobile device 2 in relation to the catch of the animal can also be stored by the app 16 within the memory 5 of the mobile device 2 as well as included as part of the harvest data for recordation by the server 20. This provides a precise location of the animal catch in addition to its general harvest location provided by the GRC region.

In the event the mobile device 2 cannot establish a connection over a network with the server and/or other electronic devices, information that is stored by the mobile device 2 in relation to the harvest can be processed at a later time when such network connection can be established so as to ensure that a data record of the harvest is obtained and adequately recorded. For example, the harvest monitor app 16 can monitor whether a communication of harvest data has been established with the server 20 and adequately recorded. If such communication has not been established, the app 16 can automatically establish such connection at a time when a network connection is achieved or, alternatively, automatically notify the user that a connection has not been established to adequately transfer harvest data to the server 20 so as to notify the user that a record of the harvest should be communicated (either manually or via the app 16) at a later time.

Thus, the system, comprising an electronic device, a server, and one or more computer readable storage media including one or more software applications, facilitates operations in accordance with the present invention that provides adequate identification and recordation of harvest data for a harvested animal that may be required by a designated federal, state and/or local governmental body or authority that manages and governs harvest records for regulated fish and/or game animals in the GRC region in which the animal is harvested. Such information can also be made available for use by a server hosted by a private entity that provides information to users (e.g., on a subscription basis) who desire information regarding types and/or frequency of animals harvested in particular GRC regions.

Further, for certain GRC regions in which the designated government authority requires a tag to be recorded for a harvested animal, the harvest data stored by the harvest monitor app 16 at the mobile device 2 and that is provided to a server 20 for recordation can further serve as an electronic tag for the harvested animal. The harvest data stored at the mobile device 2 can further be displayed as evidence that the harvested animal has been tagged in the event a user encounters a government official (e.g., a game warden) having authority for the GRC region.

Information utilized by the harvest monitor app 16 and/or to be provided as harvest data to a server 20 by the app 16 can be obtained/transferred by the mobile device 2 via automatic downloads/uploads (e.g., at designated hourly, daily, weekly or monthly time intervals) and/or manually (e.g., by the user prompting, via the GUI 40 of the app 16, a download of information to the mobile device 2 or an upload of harvest data to a server 20).

Thus, the harvest data provided via the mobile device (or other electronic device) via suitable software of the device can be used for the tracking of fish and game harvests for reference and use by public or private entities. Such entities may include, without limitation, federal, state and/or local governing bodies, and private (e.g., "for profit") entities or educational (e.g., "not-for-profit") entities. Private entities might gather such harvest data for marketing the data to users (e.g., subscribers) interested in such information (e.g., for hunters and/or fishing enthusiasts planning vacations, hunting/fishing trips, for recreational or commercial harvest sporting activities, etc.). Educational entities might desire such harvest data for purposes of public education and/or research.

Other features of the harvest monitor app 16 include allowing the user to manually check a GRC to confirm that it correctly identifies the region in which the harvest occurred (e.g., the GRC correctly corresponds with GPS information obtained by the mobile device 2) and allow the user to report to the server 20 (or other electronic device via a network) that there may be an error with the GRC. The app 16 can also be configured to enable the user to report other inaccurate information associated with a GRC (e.g., a referenced zone, territory or body of water), an inaccurate animal code, etc. Verification of the harvest data can be achieved in a series of verification prompts, requests or messages provided by the app 16 utilizing the GUI 40. When the final verification message has been confirmed by the user, the information gathered during the harvest information collection process can be stored by the mobile device 2 and/or provided to the server 20.

In the event a network connection is not available at the current time (e.g., the user may be in a GRC zone where cellular/mobile phone service is spotty or unavailable), the app 16 can be configured to facilitate a manual check of the GRC or other harvest information via data already stored by the mobile device 2 (e.g., via a previous download of such data).

Figure 6:
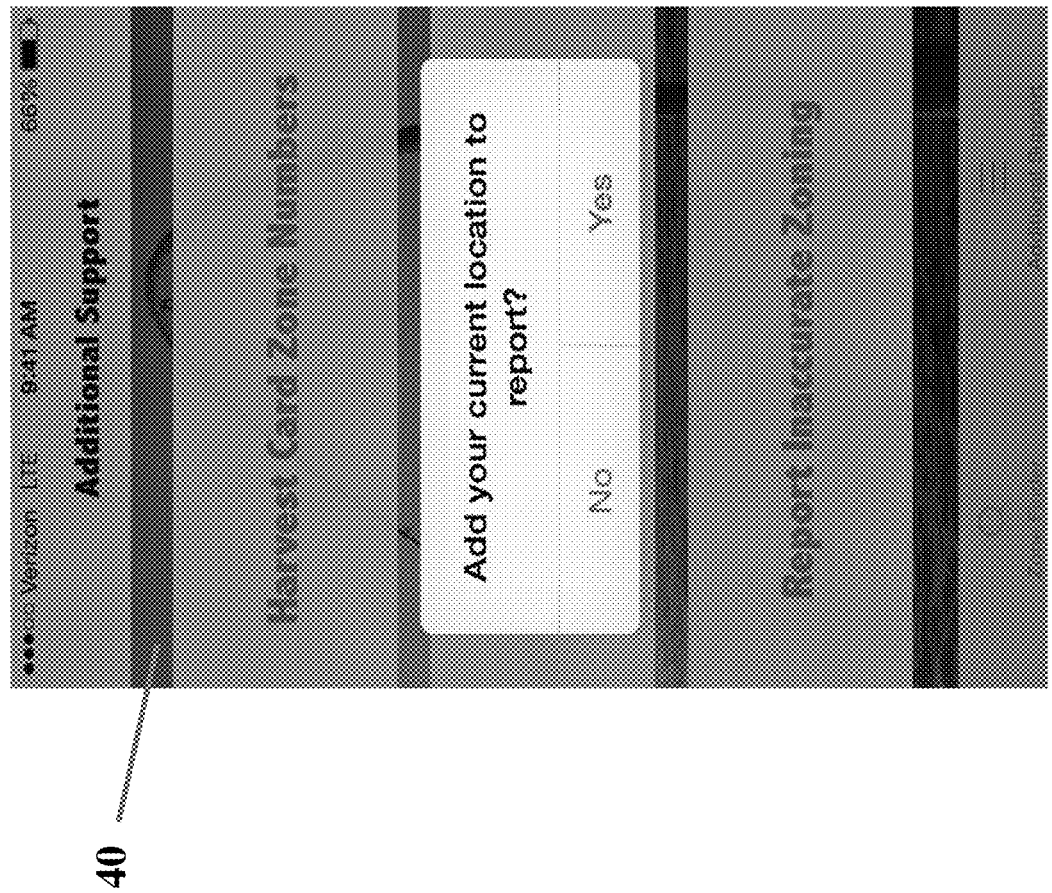
FIG. 6 depicts an example embodiment of a graphical user interface for the electronic device of FIG. 1 that implements certain features in accordance with the present invention.

In an example embodiment depicted in FIGS. 5A-5C, additional information and/or functions are enabled via the GUI 40 of the harvest monitor app 16, where the user can make a selection (as depicted by the display icons or interactive buttons 60 in FIG. 5A) to view a display of GRCs (also referred to as harvest zone numbers, displayed in the list 62 of FIG. 5B when the user selects this function), view local regulations (e.g., current fishing regulations for the state of Oregon, provided as a PDF document 64 for display by the mobile device 2 as depicted in FIG. 5C), or report inaccurate zoning information to the server 20. As part of the inaccurate zone reporting (or provided as a separate function), the GUI 40 of the app 16 can also enable the user to report their current location, either as a GRC or a description of the user's location (e.g., utilizing functions enabled by the GUI 40 as depicted in FIG. 6). For example, the user may determine that a GRC is incorrectly associated with certain GPS coordinates. In the event the user has identified the correct GRC that should be associated with the user's precise location (e.g., by viewing the list 62 depicted in FIG. 5B), the user might enter this GRC such that the correct GRC is associated with the GPS information provided by the user's mobile device 2.

Harvest data records can be provided to a single server or to multiple servers hosted by multiple parties that provide a database of the harvest data records from the present user as well as other users associated with the system. The timing of harvest data uploads to a particular server/database system can be defined by a service or licensing agreement between the parties. The harvest data can be provided in any suitable format that can be used by electronic devices associated with the system.

The following examples provide scenarios in which the system may be implemented to benefit users in relation to the harvest data collected.

Example 1

A fisherman may have interest in knowing the most up to date location where a certain type of fish is being caught. By accumulating the harvest data associated with a particular GRC region and/or specific GPS data points associated with the harvest data, such data may be of value to the fisherman in determining a spot or location to fish. This information provides value to customers such as fishing guides, commercial fisherman, sportsman and educational or research entities.

Example 2

Server databases can provide tiered programs or subscription rates to users with different, more advanced features depending upon the subscription tier. In addition, the harvest monitor software 28 of one or more servers may be configured to provide targeted advertising to subscribers based upon GRC locations of interest (e.g., advertising for hotels, restaurants, commercial fishing charters, etc. for a particular GRC region of interest to a particular user as indicated by harvest data downloaded from the server 20 to the user's mobile or other electronic device).

For example, one or more hotels within a GRC region of interest to a subscriber (as indicated by harvest data downloads by the device of the subscriber) may desire to provide target advertising to such subscriber. The harvest monitor app 16 and/or harvest monitor software 28 can be configured to facilitate such target advertising.

Figure 7:
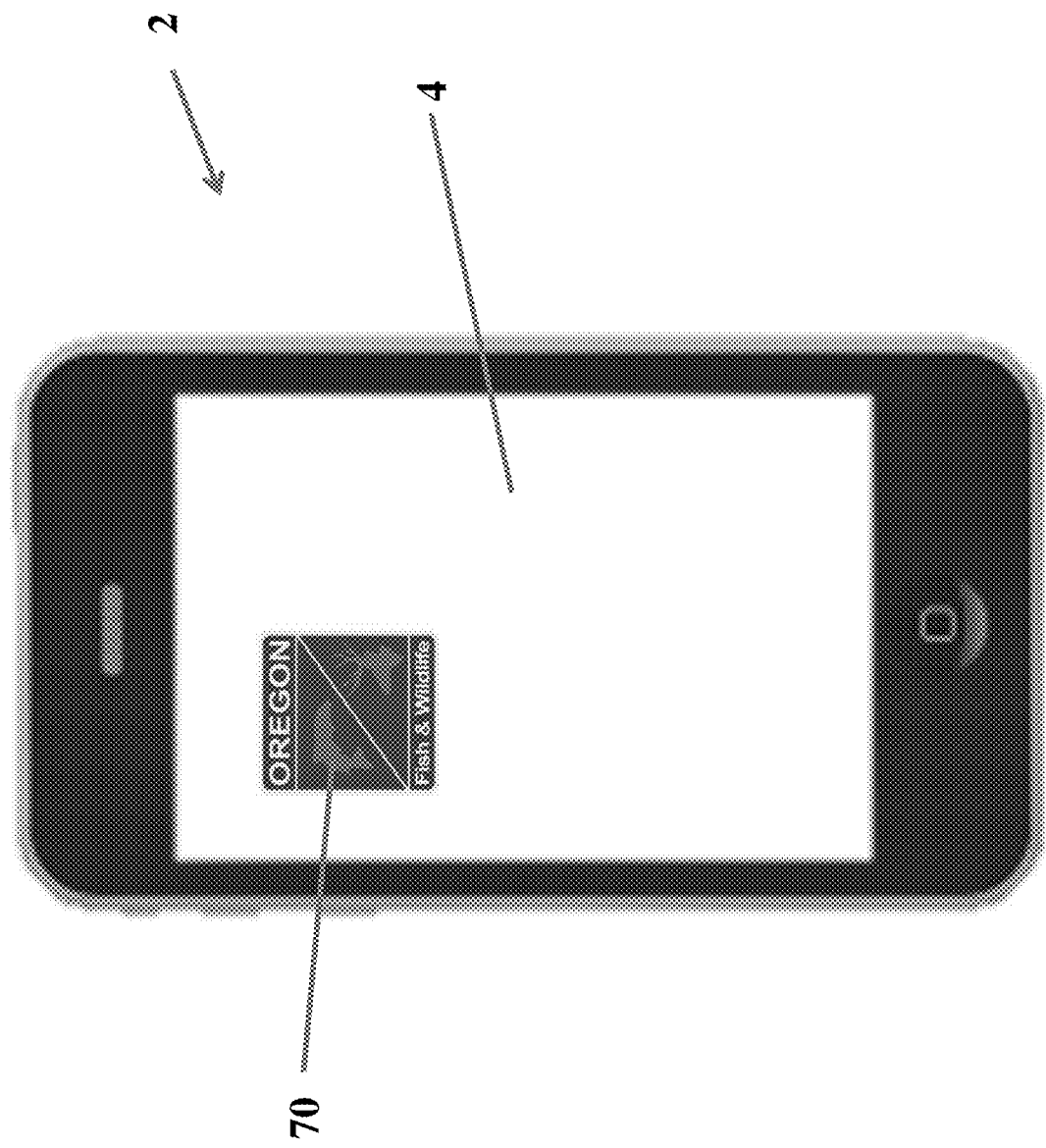
FIGS. 7-18 depict an example embodiment of a graphical user interface for the electronic device of FIG. 1 that implements features of a mobile app for recording catches for fishing in accordance with the present invention.

An example embodiment of a harvest monitor mobile app implemented for use by a mobile device 2 is now described with reference to FIGS. 7-18. Referring to FIG. 7, a user accesses a mobile app 70 that integrates features of the harvest monitor mobile app described herein with features associated with a particular state's gaming regulations. In this scenario, the mobile app 70 integrates features of the harvest monitor app with fishing regulations for the state of Oregon, including features of associating a state registered fishing license registration associated with a catch as well as obtaining and/or recording information associated with one or more punch cards associated with a fishing license. A punch card is obtained in association with a registered fishing license and provides a mechanism for one to record catches of particular types of fish.

Figure 4B:
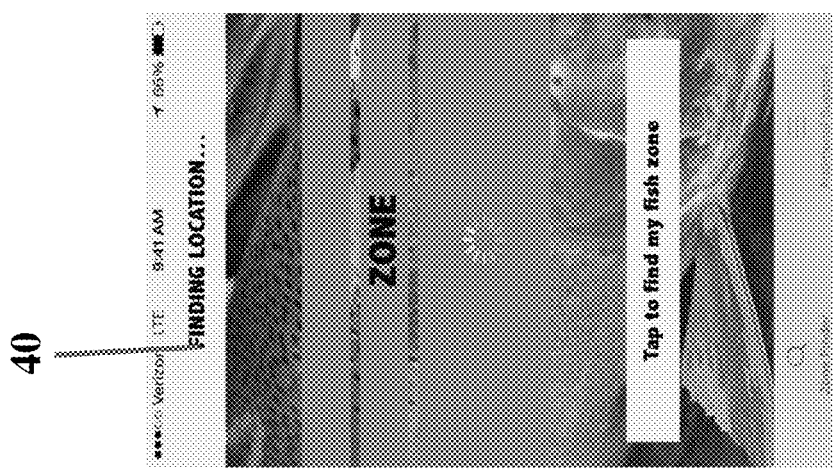
Figure 4A:
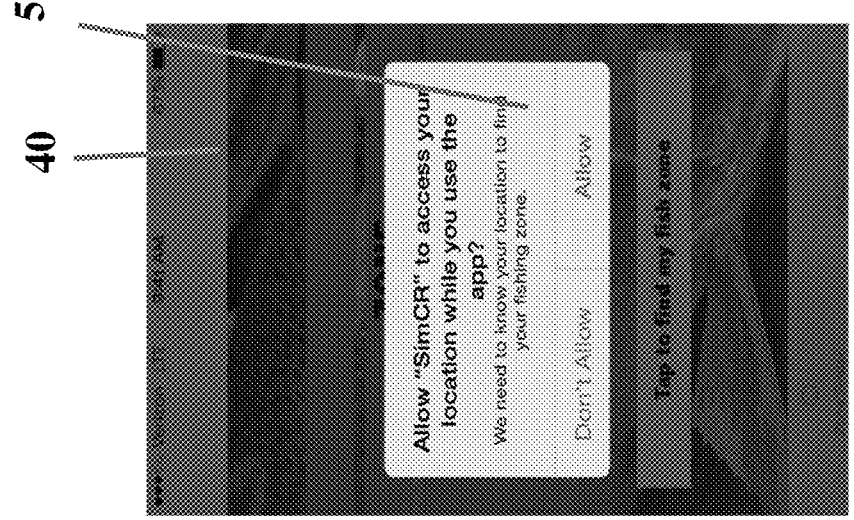
Figure 4D:
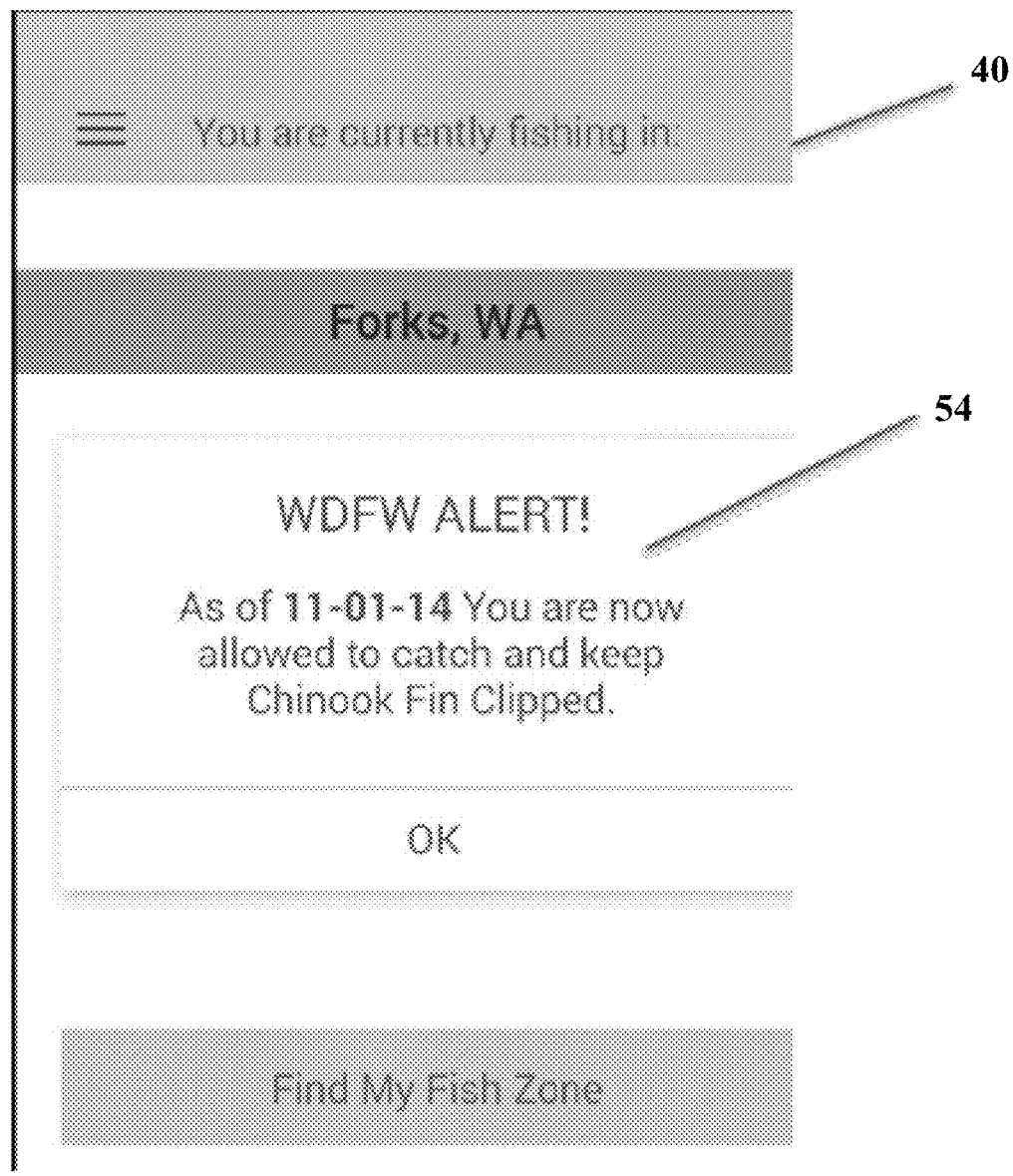
Figure 8:
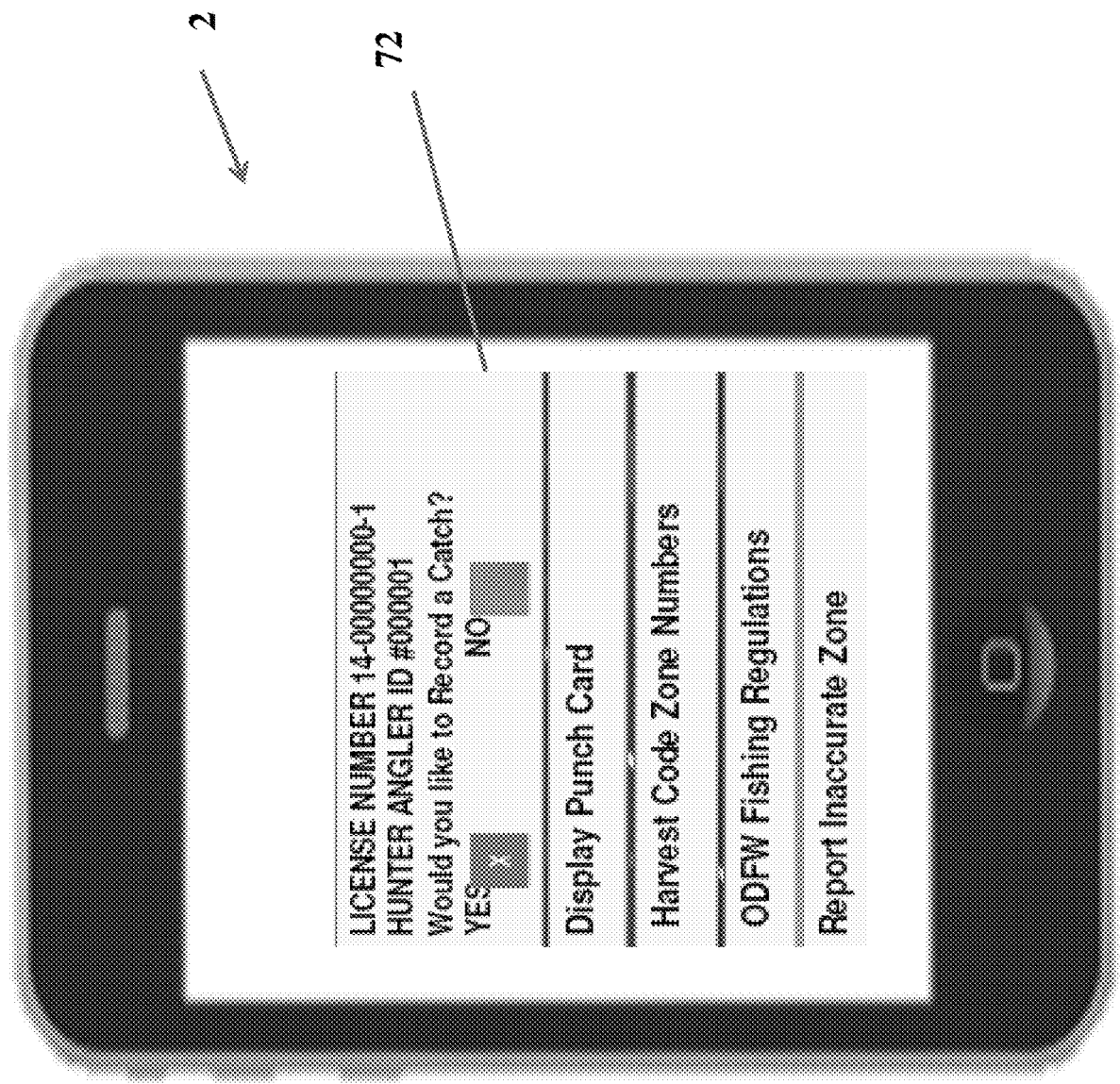

When a user initiates or opens the mobile app 70 on his or her mobile device 2, a main menu 72 as depicted in FIG. 8 can be initially be provided that allows the user to select from a number of features, including recording a catch, display of a punch card associated with the user's license registration, finding a GRC (harvest zone number) such as the GRC in which the user is located (e.g., utilizing techniques as described herein and with reference to FIGS. 4A-4C), obtaining state fishing regulations (e.g., ODFW or Oregon Department of Fish and Wildlife fishing regulations), and the option for a user to report an inaccurate zone or GRC. As depicted in FIG. 8, a selection is made by the user to record a catch.

Figure 9:
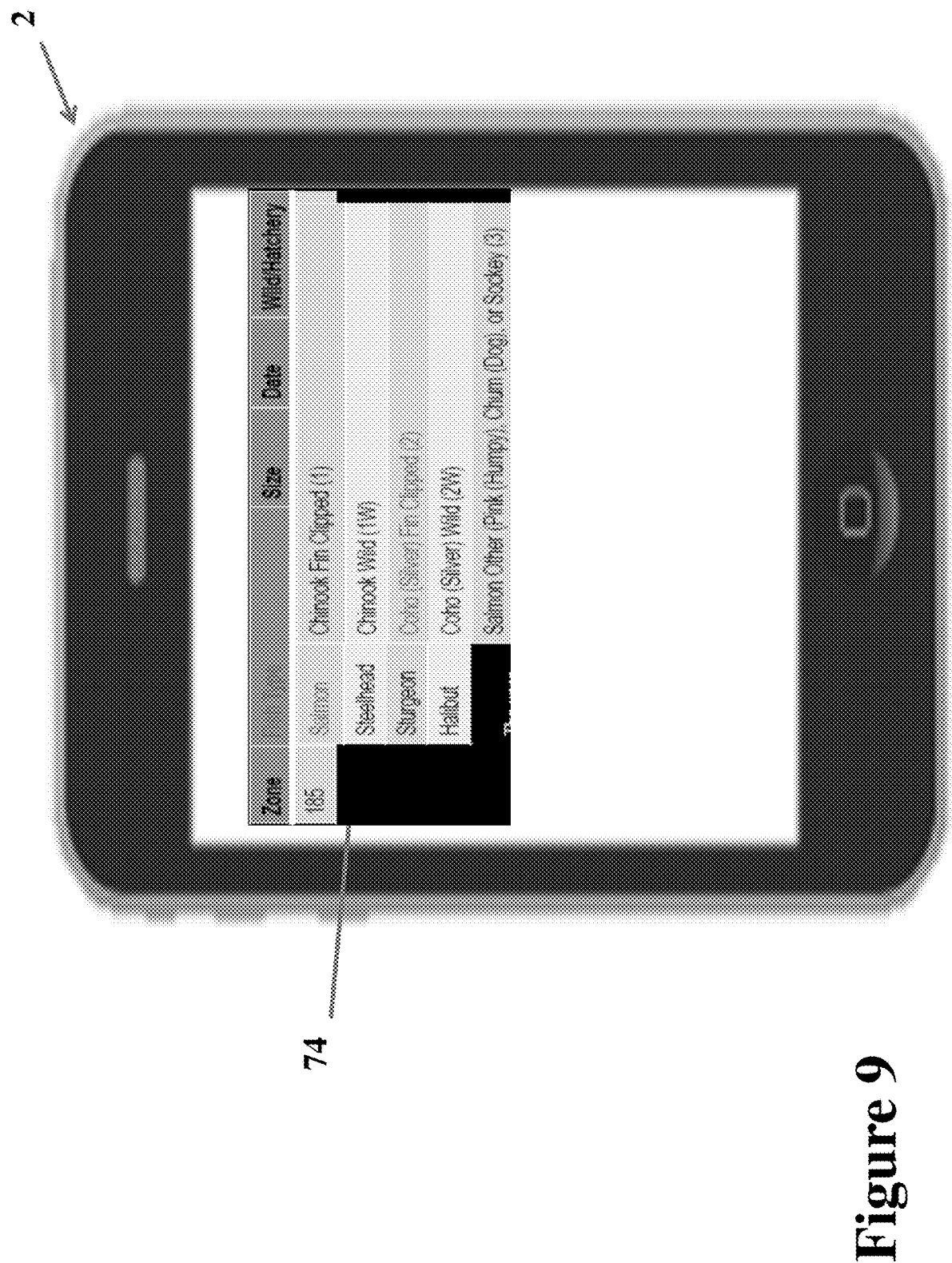
Figure 10:
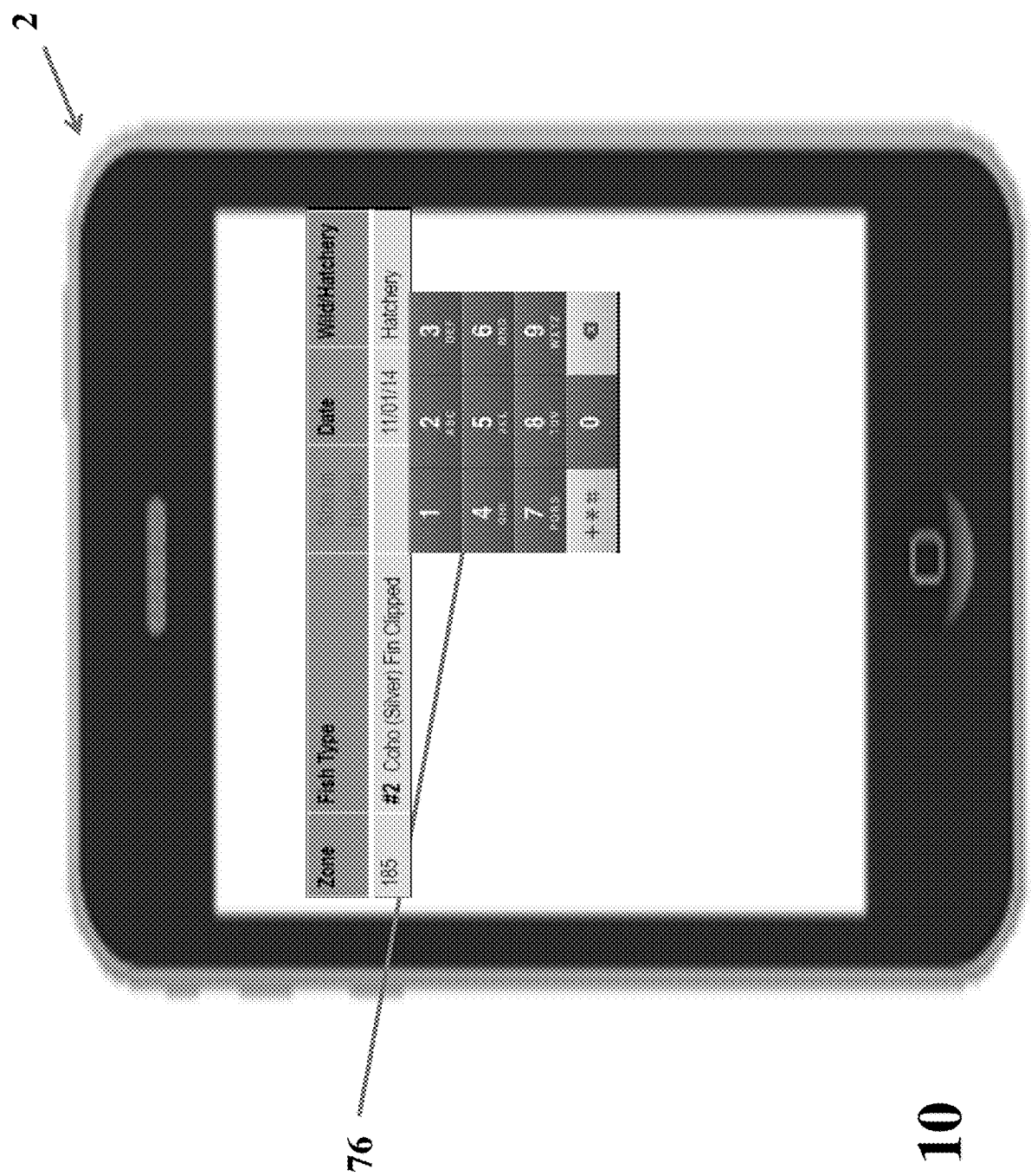
Figure 11:
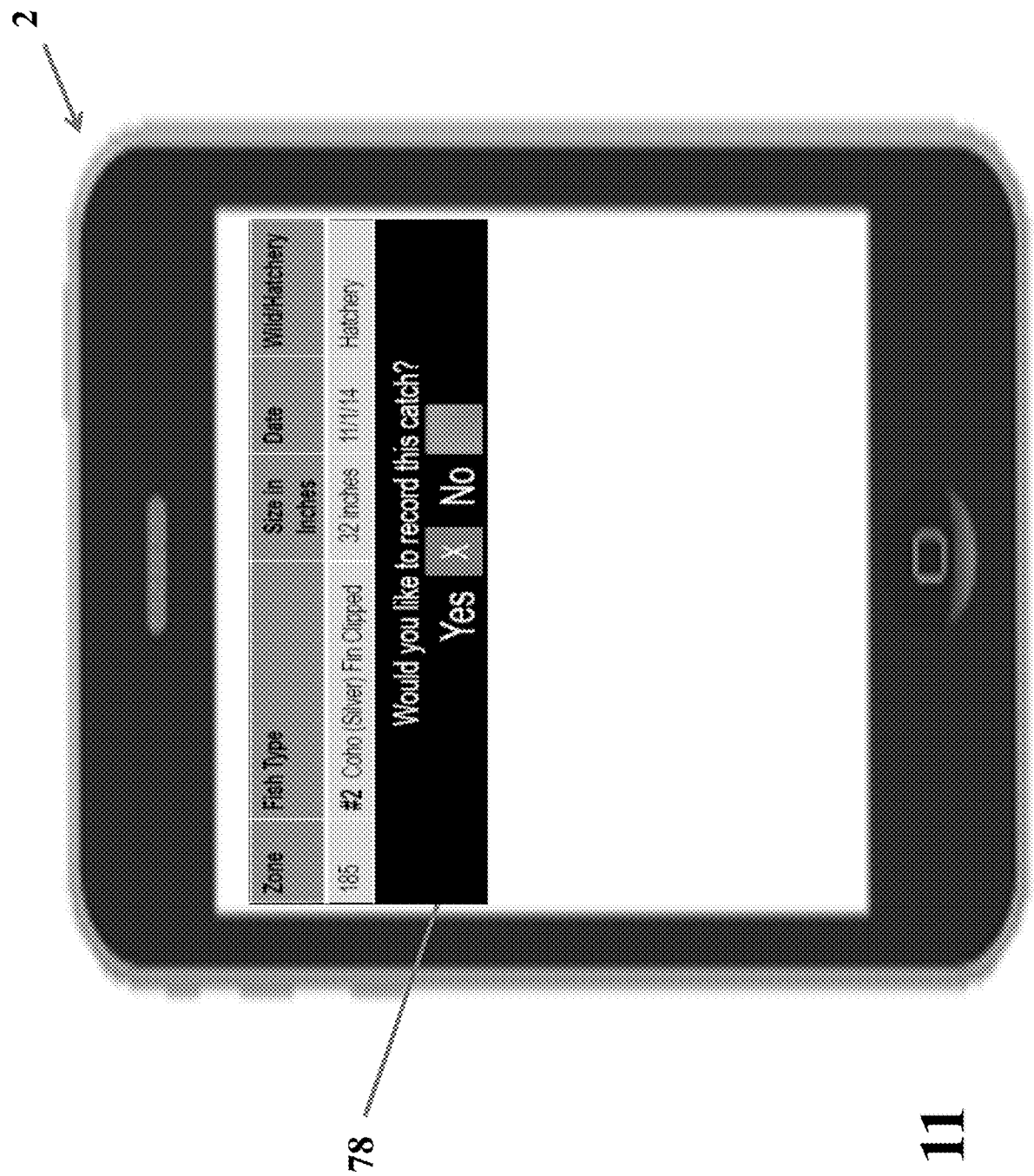

At FIG. 9, a drop-down menu 74 is depicted allowing the user to select the type of fish caught. The zone (185) is shown and a series of options for fish associated with the zone are available to choose from for the user. The user can select an option (e.g., Coho Silver Fin Clipped) for a fish that is caught. As previously noted, the mobile app can also provide other options for a user to provide information about the fish caught, including the capture of an image of the fish for later identification.

Once the fish is selected, an option 76 is provided at FIG. 9 to allow the user to input information about the size of the fish (e.g., a length in inches). After such information has been entered by the user, the mobile app, at FIG. 10, allows the user the option of recording the catch with the specific information provided (i.e., specific type of fish, size of fish, GRC location for catch, date and/or time of catch, etc.). In response to the user selecting "Yes", the catch is recorded and applied to the punch card associated with the user's fishing license registration. It is noted that, once a catch is recorded, it cannot be revised or altered since it is recorded with the state's electronic database via the mobile app 70. The mobile app 70 is then returned to the main menu 72 (FIG. 8).

Figure 12:
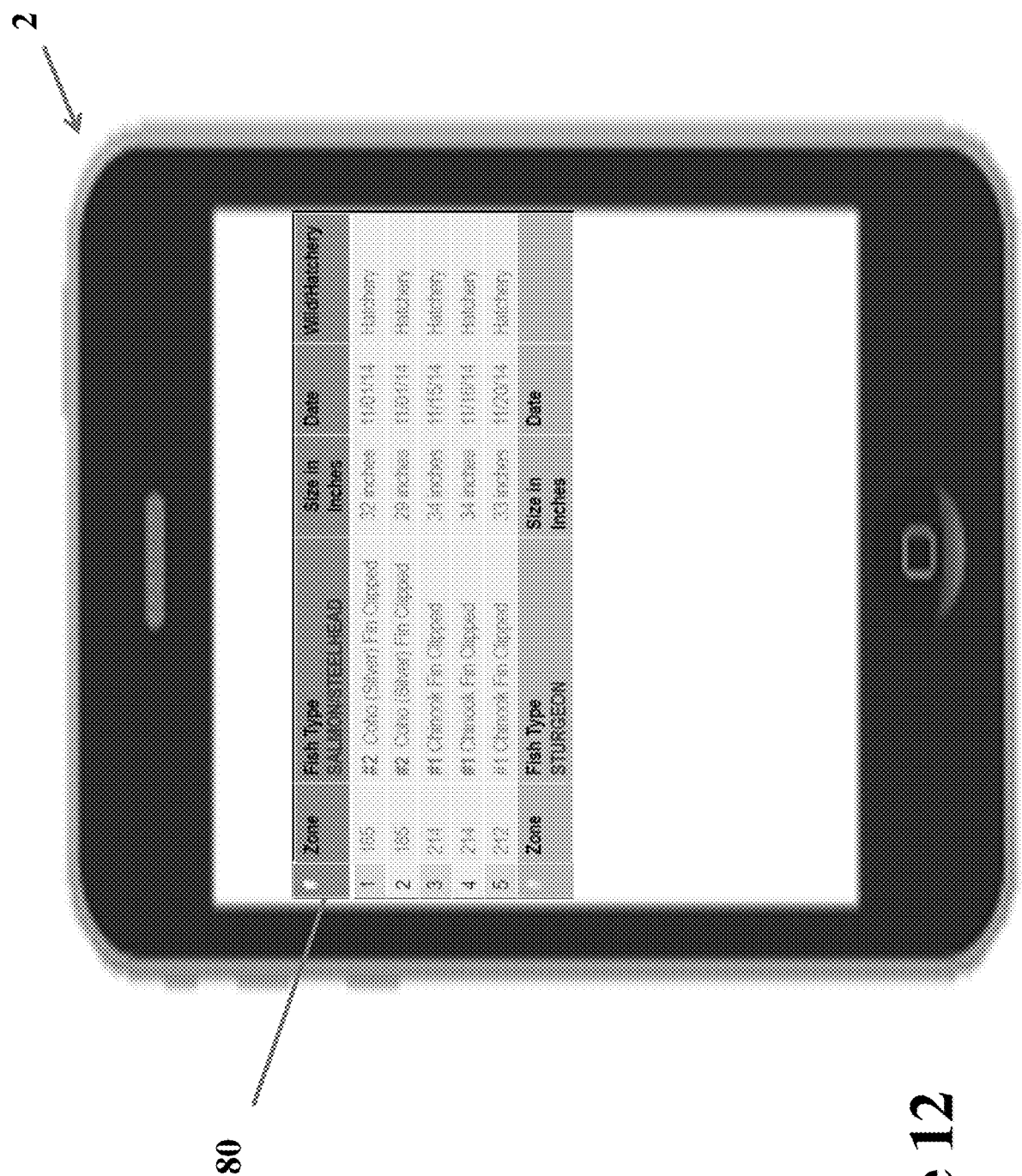
Figure 13:
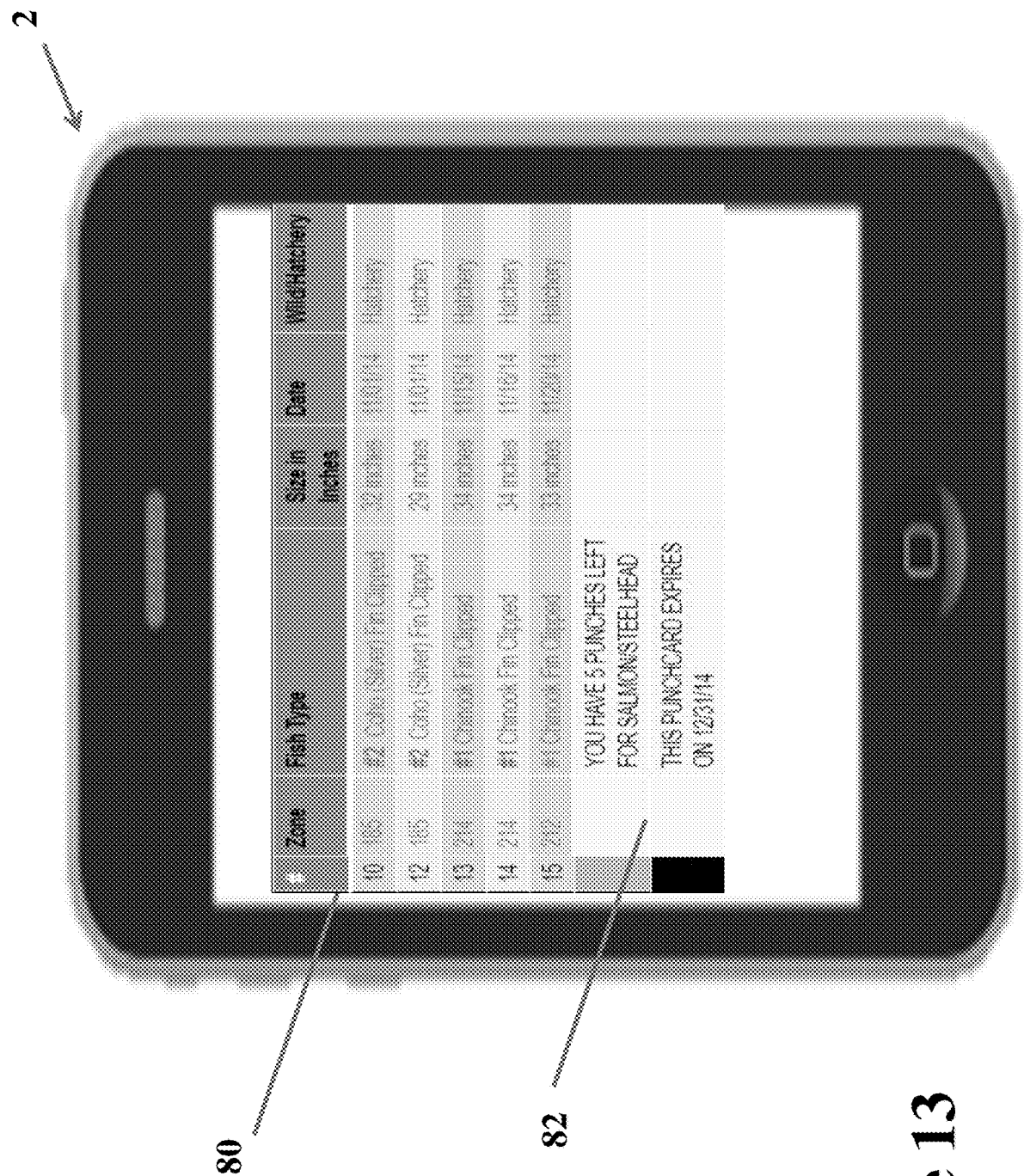

The mobile app 70 allows the user to view his or her electronic punch card 80, as shown in FIG. 12. The punch card 80 shows all of the catches made by the user (including number of harvested animals) and recorded with the punch card stored by the mobile app 70 (and/or optionally uploaded to a server 20). In addition, as depicted in FIG. 13, the mobile app 70 can further be configured to provide additional information associated with the user's punch card 80, such as an alert regarding the expiration date for the punch card as well as information relating to the user's punch card approaching a maximum number of a type of fish allowed to be caught by the user for the punch card registration period (e.g., a notice indicating the user has "only 5 punches left for Salmon Steel Head" as shown in FIG. 13).

Figure 14:
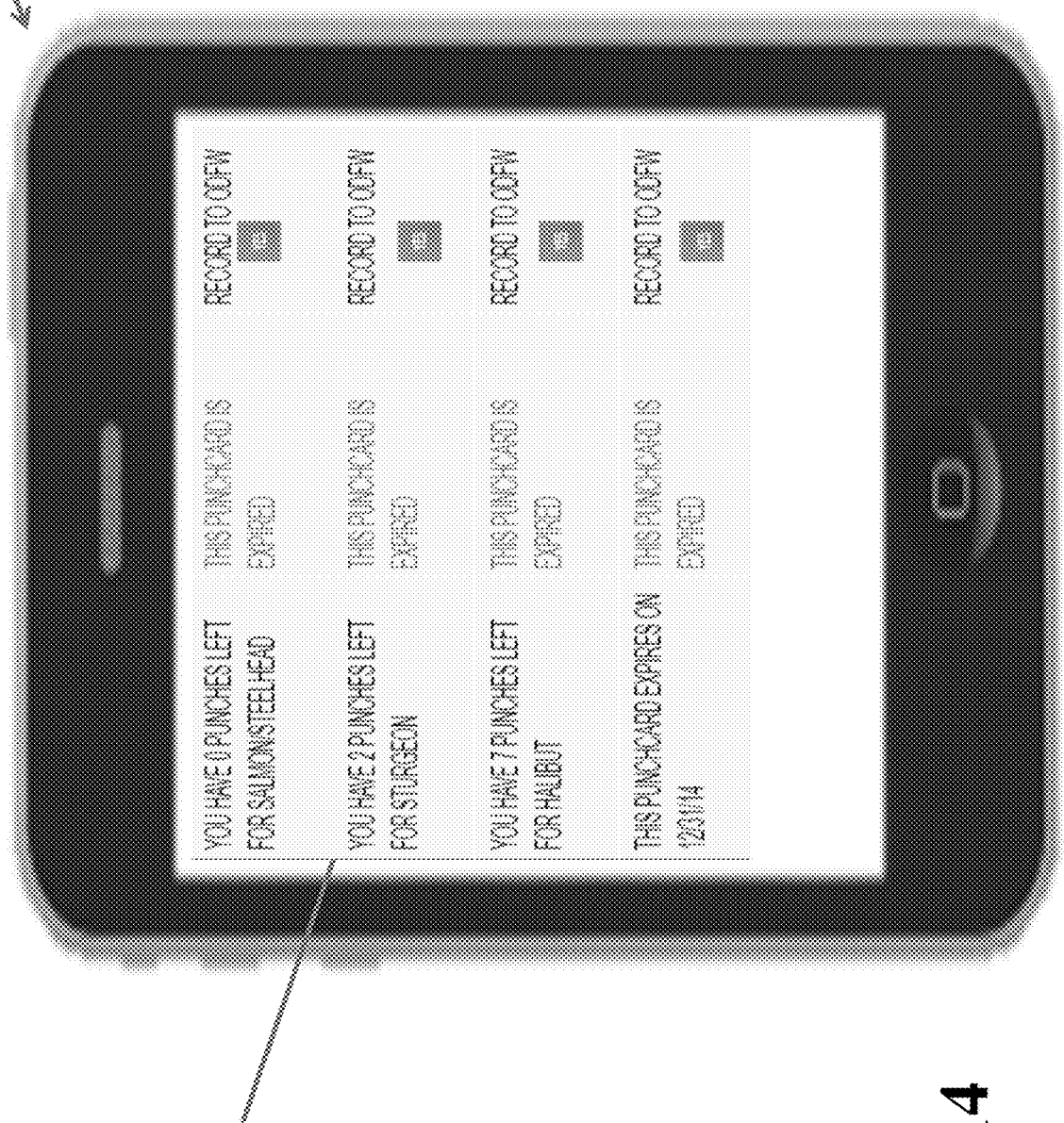
Figure 15:
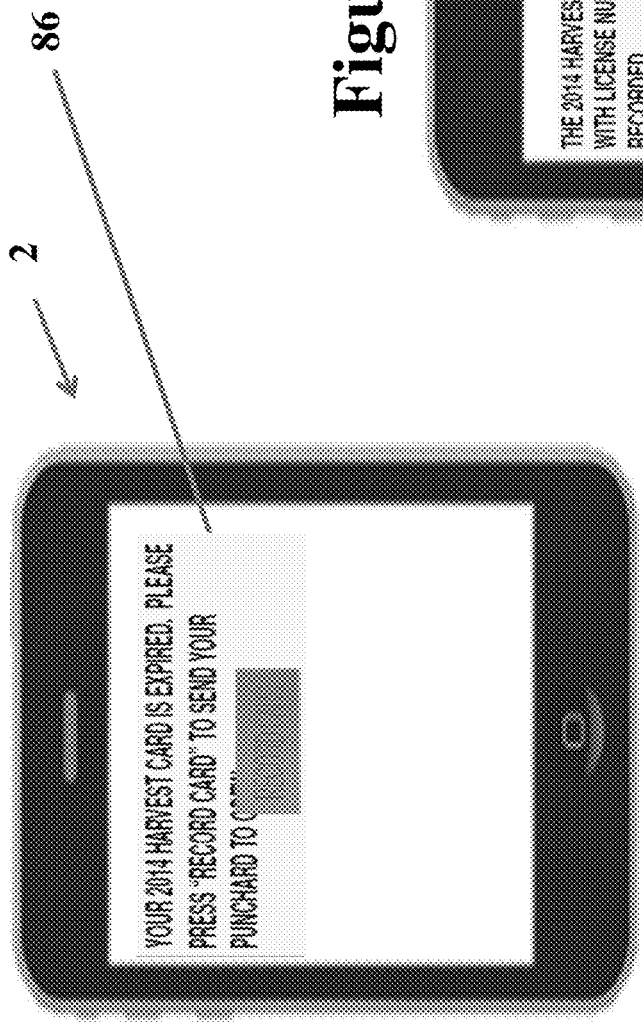
Figure 16:
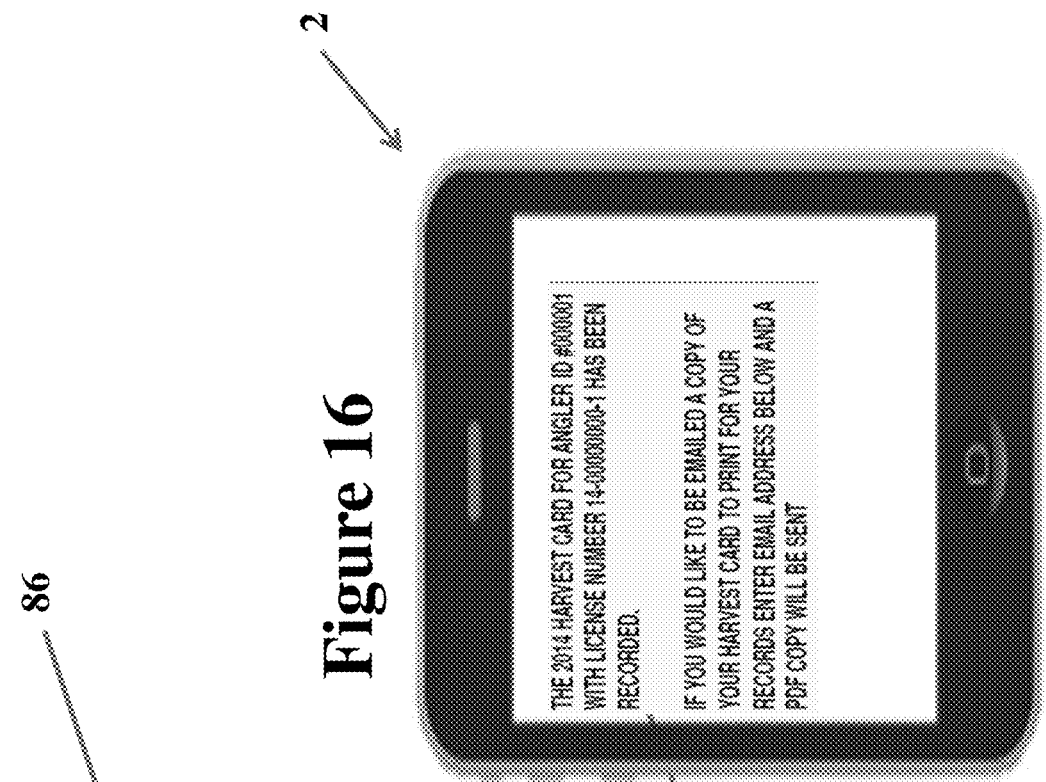

The mobile app 70 can further be prompted to provide automated messages indicating when a punch card is about to expire, has expired and/or has no punches left for a particular type of fish, where the prompt can be displayed as depicted in FIG. 14. When a punch card 80 expires, the mobile app 70 provides a display prompt 86 at FIG. 15 allowing a user to record the punch card with the state (e.g., by uploaded the electronic punch card information to a server associated with the state of Oregon, such as a server 20). When the user selects to record the punch card 80, a display message 88 is provided in FIG. 16 indicating when recordation takes place and providing the user with the option (e.g., by providing an email address) for where an electronic copy (e.g., a PDF copy) of the recordation is to be provided.

Figure 17:
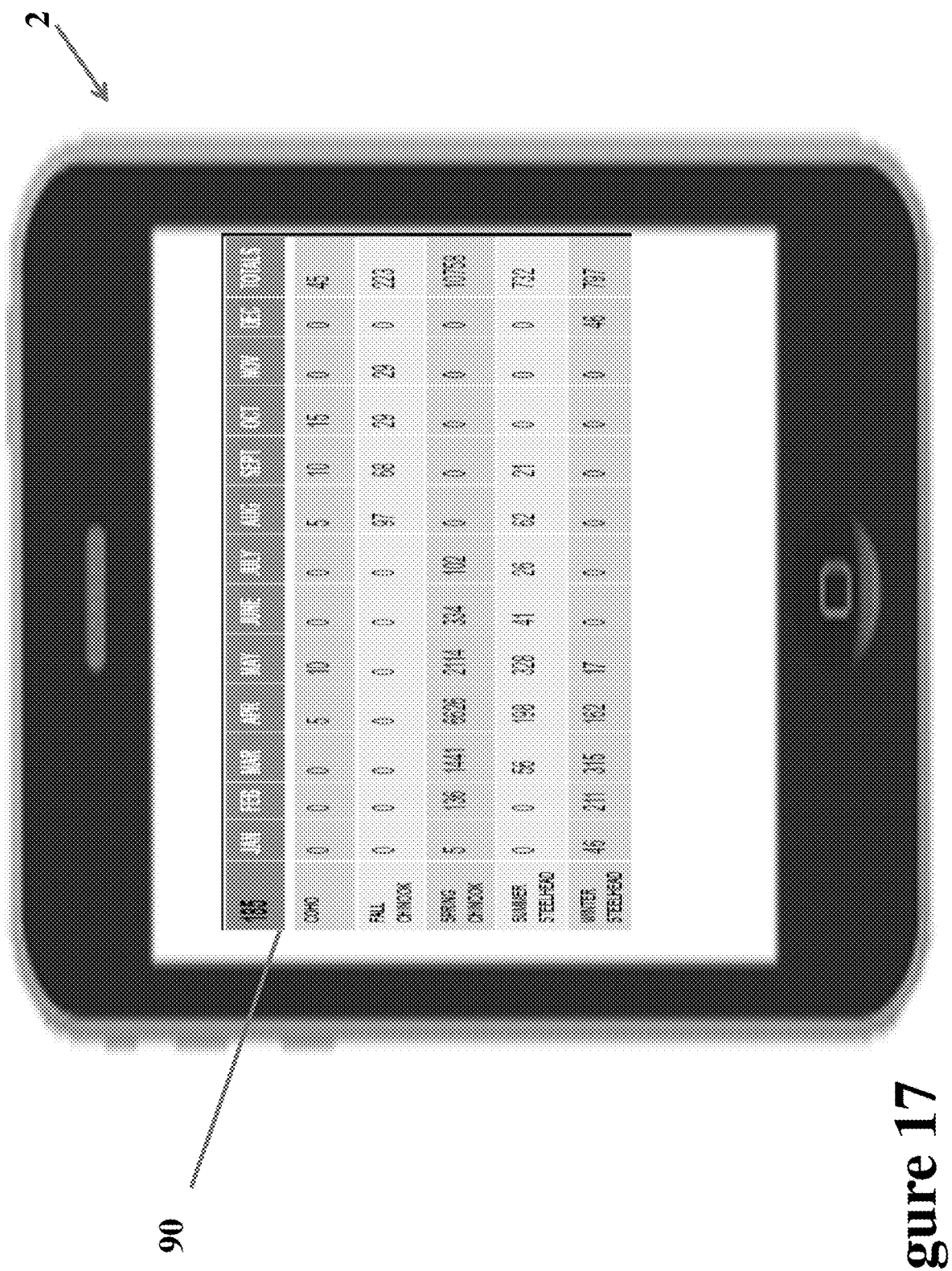
Figure 18:
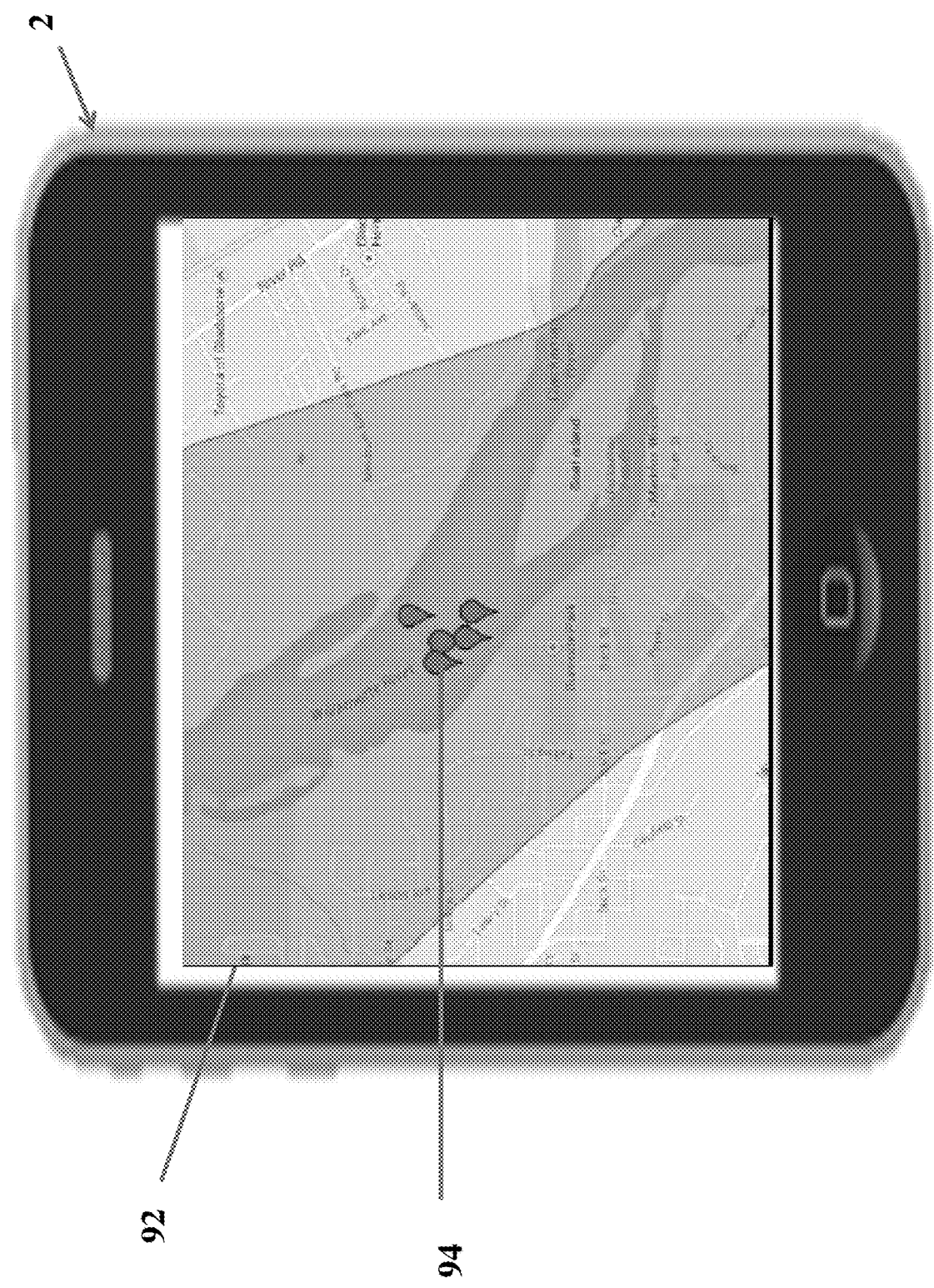

The mobile app 70 can also be configured to provide a user option (e.g., via a prompt selection at the main menu of the mobile app) to view recorded data about the user's registered catches as well as total registered catches by all users of the system, where recorded data can be presented in any suitable manner that is useful to the user. For example, a user might select a particular GRC location (e.g., 185), and the mobile app 70 can provide a display table 90 as shown in FIG. 17 of catch data for a particular time period, such as month-to-month data for a particular year, of the number of particular types of fish caught at the selected GRC. Other types of data can also be provided to the user via the mobile app 70. For example, if the user selects a particular type of fish, the mobile app 70 can provide data regarding GRC locations at which the particular type of fish has been registered as caught as well as a breakdown of catch number over selected time periods (e.g., on a month-to-month basis, a day-to-day basis, etc.) for such GC locations. As depicted in FIG. 18, a display map 92 can also be provided via the mobile app 70 which shows locations via icons 94 on the map 92 where particular fish are caught. The map can be updated in real time to provide a focused view of where and what types of fish are caught at any given time.

The mobile app embodiments of the present invention can further be associated with an existing user's fishing license, for example, based upon a bar code and/or or a QR (quick response) code printed on the user's license registration card or other issued paperwork provided by a state or other government agency. In an example embodiment, a user who may not have the mobile app on his or her smart phone may scan a bar code or QR on his or her printed license registration, where the scanning action might prompt the smart phone to visit an Internet website location that allows the user to download the mobile app to his or her smart phone. In scenarios in which the user already has the mobile app loaded on his or her smart phone, scanning of the bar code or QR will link or associate the user's license registration with the mobile app for purposes of registering numbers and/or types of catches, punch cards and/or utilizing other features of the mobile app.

Thus, the present invention facilitates a number of advantages for identifying and recording animal harvests for the government sector (managing wildlife ecology), the private (commercial) sector and for educational purposes.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed:

1. One or more computer readable storage media encoded with software comprising computer executable instructions and when the software is executed operable to:
   facilitate entry by a user into a first electronic device an indication of an animal harvest;
   generate information associated with the animal harvest, wherein the generated information comprises an automatic identification of an animal species, and at least one of a geographic location indicating where the animal harvest occurred and a date of the animal harvest, and the automatic identification of the animal species comprises automatically assigning an animal code to the animal harvest based upon an image of the animal harvested that is captured by a camera of the first electronic device;
   upload harvest data from the first electronic device to a second electronic device, wherein the harvest data includes at least some of the generated information associated with the animal harvest; and
   associate the uploaded harvest data with a hunting or fishing license of the user of the first electronic device, wherein the associating the uploaded harvest data with the hunting or fishing license of the user of the first electronic device includes associating the uploaded harvest data with a number of harvested animals by the user and further comparing the number of harvested animals by the user with a maximum number of animals allowed to be harvested by the user based upon a number of animals the user has registered to harvest via the hunting or fishing license of the user.

2. The one or more computer readable storage media of claim 1, wherein the first electronic device comprises a mobile device, and the second electronic device comprises a server that stores the harvest data in a database including harvest data associated with other animal harvests.

3. The one or more computer readable storage media of claim 2, wherein the mobile device comprises a mobile phone, and the instructions are further operable to:
   obtain Global Positioning System (GPS) information associated with the mobile phone.

4. The one or more computer readable storage media of claim 3, wherein the GPS information corresponds with the geographic location indicating where the animal harvest occurred, and the instructions are further operable to:
   based upon the obtained GPS information, determine a geographic reference code (GRC) associated with the geographic location indicating where the animal harvest occurred;
   wherein the harvest data uploaded to the server includes the GRC.

5. The one or more computer readable storage media of claim 4, wherein the instructions are further operable to:
   based upon the GRC, provide an alert message regarding a specific animal species for the GRC.

6. The one or more computer readable storage media of claim 4, wherein the instructions are further operable to:
   facilitate downloading of information to the mobile device comprising records of harvested animals at any GRC selected by the user via the mobile device.

7. The one or more computer readable storage media of claim 1, wherein the associating the uploaded harvest data with the hunting or fishing license of the user of the first electronic device includes associating the uploaded harvest data with a punch card for the user that compares a number of harvested animals by the user with a maximum number of animals allowed to be harvested as indicated by the punch card.

8. The one or more computer readable storage media of claim 1, wherein a portion of the generated information associated with the animal harvest is generated by the second electronic device.

9. A computer-implemented method for recording an animal harvest, the method comprising:
   receiving by user entry into a first electronic device an indication of an animal harvest;
   generating information associated with the animal harvest, wherein the generated information comprises an automatic identification of an animal species, and at least one of a geographic location indicating where the animal harvest occurred and a date of the animal harvest, and the automatic identification of the animal species comprises automatically assigning an animal code to the animal harvest based upon an image of the animal harvested that is captured by a camera of the first electronic device;
   uploading harvest data from the first electronic device to a second electronic device, wherein the harvest data includes at least some of the generated information associated with the animal harvest; and
   associating the uploaded harvest data with a hunting or fishing license of the user of the first electronic device, wherein the associating the uploaded harvest data with the hunting or fishing license of the user of the first electronic device includes associating the uploaded harvest data with a number of harvested animals by the user and further comparing the number of harvested animals by the user with a maximum number of animals allowed to be harvested by the user based upon a number of animals the user has registered to harvest via the hunting or fishing license of the user.

10. The method of claim 9, wherein the first electronic device comprises a mobile device, and the second electronic device comprises a server that stores the harvest data in a database including harvest data associated with other animal harvests.

11. The method of claim 10, wherein the mobile device comprises a mobile phone, and the method further comprises:
    obtaining Global Positioning System (GPS) information associated with the mobile phone.

12. The method of claim 11, wherein the GPS information corresponds with the geographic location indicating where the animal harvest occurred, and the method further comprises:
    based upon the obtained GPS information, determine a geographic reference code (GRC) associated with the geographic location indicating where the animal harvest occurred, wherein the harvest data uploaded to the server includes the GRC.

13. The method of claim 12, wherein the method further comprises:
    based upon the GRC, providing an alert message to the mobile device regarding a specific animal species for the GRC.

14. The method of claim 12, wherein the method further comprises:
    downloading information to the mobile device comprising records of harvested animals at any GRC selected by the user via the mobile device.

15. The method of claim 9, wherein the associating the uploaded harvest data with the hunting or fishing license of the user of the first electronic device includes associating the uploaded harvest data with a punch card for the user that compares a number of harvested animals by the user with a maximum number of animals allowed to be harvested as indicated by the punch card.

16. The method of claim 9, wherein a portion of the generated information associated with the animal harvest is generated by the second electronic device.

17. One or more computer readable storage media encoded with software comprising computer executable instructions and when the software is executed operable to:
- facilitate entry by a user into a first electronic device information associated with an animal harvest, wherein the information comprises an animal species selected from a list of animal species provided within a graphical user interface (GUI) displayed by the first electronic device, wherein the selected animal species is associated with an animal code;
- obtain Global Positioning System (GPS) information from the first electronic device;
- based upon the GPS information, obtain a geographic reference code (GRC) representing a geographic location indicating where the animal harvest occurred and the animal code for the harvested animal;
- upload harvest data from the first electronic device operated by the user to a second electronic device operated by an entity other than the user, wherein the harvest data includes the information entered by the user as well as the GRC and the animal code, and the second electronic device collects harvest data from the user and from other electronic devices operated by other users; and
- associate the uploaded harvest data with a hunting or fishing license of the user of the first electronic device, wherein the associating the uploaded harvest data with the hunting or fishing license of the user of the first electronic device includes associating the uploaded harvest data with a number of harvested animals by the user and further comparing the number of harvested animals by the user with a maximum number of animals allowed to be harvested by the user based upon a number of animals the user has registered to harvest via the user's license.

* * * * *